(12) United States Patent
Waeckerle (10) Patent No.: US 9,566,721 B2
(45) Date of Patent: Feb. 14, 2017

(54) MOLD, METHOD FOR MANUFACTURING A MOLD AND METHOD FOR MANUFACTURING A PLASTIC OR COMPOSITE MATERIAL PRODUCT BY MEANS OF SAID MOLD

(75) Inventor: Thierry Waeckerle, Nevers (FR)

(73) Assignee: APERAM, Luxembourg (LU)

(*) Notice: Subject to any disclaimer, the term of this patent is extended or adjusted under 35 U.S.C. 154(b) by 1094 days.

(21) Appl. No.: 13/580,289

(22) PCT Filed: Feb. 23, 2011

(86) PCT No.: PCT/FR2011/000109
§ 371 (c)(1),
(2), (4) Date: Dec. 10, 2012

(87) PCT Pub. No.: WO2011/104447
PCT Pub. Date: Sep. 1, 2011

(65) Prior Publication Data
US 2013/0075956 A1 Mar. 28, 2013

(30) Foreign Application Priority Data
Feb. 23, 2010 (WO) .................. PCT/FR2010/000166

(51) Int. Cl.
*B29C 33/06* (2006.01)
*B29C 35/08* (2006.01)
(52) U.S. Cl.
CPC ........... *B29C 33/06* (2013.01); *B29C 35/0805* (2013.01); *B29C 2035/0811* (2013.01)

(58) Field of Classification Search
CPC ...................................................... B29C 33/06
See application file for complete search history.

(56) References Cited

U.S. PATENT DOCUMENTS

| 2,393,541 | A | * | 1/1946 | Kohler ............... B29C 65/4835 |
| | | | | 106/170.58 |
| 4,563,145 | A | * | 1/1986 | de Meij ................. B29C 33/04 |
| | | | | 425/385 |
| 5,641,422 | A | | 6/1997 | Matsen et al. ................ 219/633 |
| 2002/0090501 | A1 | * | 7/2002 | Tobita ...................... C08K 9/02 |
| | | | | 428/297.4 |

(Continued)

FOREIGN PATENT DOCUMENTS

| FR | 2 488 185 | 2/1982 |
| FR | 2 867 939 | 9/2005 |
| FR | 2 928 808 | 9/2009 |

*Primary Examiner* — Alison L Hindenlang
(74) *Attorney, Agent, or Firm* — Davidson, Davidson and Kappel, LLC (57) ABSTRACT

An induction-heated mold, including at least one lower portion and one upper portion defining a cavity inside of which a molding material is to be brought to a temperature Ttr greater than 20° C., which is introduced and then shaped, at least one of the mold portions having an area for transferring heat with the molding material, the heat transfer area including at least one sub-area consisting of at least one ferromagnetic material the Curie point Tc of which is between 20 and 800° C. and which is in contact with the molding material and/or with a non-ferromagnetic coating having a thermal conductivity greater than 30 W.m−1.K−1. A method for manufacturing a plastic or composite material product via of the molds according to the invention.

27 Claims, 1 Drawing Sheet

(56) References Cited

U.S. PATENT DOCUMENTS

2007/0267405 A1    11/2007  Feigen-Blum ................ 219/601
2008/0063445 A1*   3/2008   Imai ..................... G03G 15/205
                                                        399/333
2011/0057357 A1    3/2011   Feigenblum et al. ........ 264/403

* cited by examiner

MOLD, METHOD FOR MANUFACTURING A MOLD AND METHOD FOR MANUFACTURING A PLASTIC OR COMPOSITE MATERIAL PRODUCT BY MEANS OF SAID MOLD

The present invention relates to a mould more particularly intended for manufacturing products in plastic or composite material, without however being limited thereto.

BACKGROUND

It is known that it is highly favorable to use a molding method applying heating by electromagnetic induction, notably for rapidly and efficiently heating plastic or composite materials which have to be shaped, but also for heating parts in metals or metal alloys before stamping them and quenching them in the tool.

According to such an induction-heating method, the molding device comprises inductors through which flows a medium frequency current igen delivered by a power generator and generating a variable electromagnetic field over time. This variable field is at the basis of the well known phenomenon of electromagnetic induction: when applied to a current conducting material, it creates a variable magnetic flux over time and an induced voltage in the conducting material, which in turn generates induced currents at the surface of the conducting metal, over a depth called the skin thickness $\delta$ and given by the relationship:

$$\delta = \sqrt{\frac{2}{\mu \cdot \sigma \cdot \omega}}$$

wherein $\mu$ is the magnetic permeability of the material with $\mu = \mu 0 \cdot \mu r$, $\sigma$ is the electric conductivity of the material (reciprocal of the electric resistivity Rel), $\omega$ is the angular frequency and is equal to $2.\pi.f$ wherein f is the frequency of the excitation current and of the generated magnetic field.

When the conducting material is not ferromagnetic, the value of $\mu r$ is close to 1 and the skin thickness is given by the relationship:

$$\delta_{amagn} = 500 \sqrt{\frac{Rel}{f}}$$

For this purpose, the material induction-heating method is known from FR 2 867 939 which describes a mold with which the precursor material which will assume its definitive properties after heat treatment, may be received in a cavity. Supplying the inductor with a medium frequency electrical current generates induced currents in the skin thickness of an intermediate part in contact with the material to be heated, which limits the volume of the part of the mold, which has to be heated.

Moreover, inside this intermediate element, blocks of inserts made from materials having distinct electric resistivities or magnetic permeabilities may be positioned in order to obtain different surface temperatures.

SUMMARY OF THE INVENTION

However, the present inventors have observed that the dimensioning and the placement of the blocks of inserts in the mold is a delicate operation which does not allow very fine adjustment of the surface temperatures.

Further, even when this placement is performed in a very fine way, which takes considerable time, it is observed that certain surface areas are subject to an overheating or subheating phenomenon, which are detrimental to good manufacturing of the molded product by generating hardness heterogeneities, for example.

Regardless of the geometry of these parts, temperature undulations are further observed at heat transfer areas which will further worsen the overheating and subheating phenomena described earlier.

It is an object of the present invention to provide a remedy to these drawbacks by proposing a mold for easier manufacturing and for which these molding temperature heterogeneities may be attenuated, as well as a method for manufacturing such a mold with which the targeted magnetic and/or thermal performances may easily be modulated.

The present invention provides a mold comprising at least one lower portion and one upper portion defining a cavity inside which a molding material is to be brought to a temperature Ttr greater than 20° C., which is introduced and then shaped by contact with said lower and upper portions of the mold which are heated by the action of an induced current generated by at least one electromagnetic inductor, at least one of said lower and upper portions having a heat transfer area with said molding material, said heat transfer area comprising at least a sub-area for heat transfer consisting of at least one ferromagnetic material having a Curie point Tc comprised between 20 and 800° C., which is in contact with said molding material and/or with a coating consisting of a non-ferromagnetic material with heat conductivity greater than 30 W.m−1K−1, itself in contact with said molding material.

Within the scope of the present invention, by heat transfer area, is meant the area(s) of the mold through which flows an induced current generated by the electromagnetic inductor. As this was seen earlier, the thickness of this area depends on the average electric resistivity of the material of the mold and on the frequency f of the excitation current and is in all cases at most equal to $\delta_{amagn}$.

It is preferred that this heat transfer area be in a single piece i.e. this is a bulk area of a single piece, which does not result from an assembly of elements and which cannot be disassembled. This term however does not exclude the presence of one or several coatings forming a body with a base substrate.

In a preferred embodiment, said heat transfer comprises at least two heat transfer sub-areas having magnetic permeability different from each other in the vicinity of said temperature Ttr, at least one of said sub-areas consisting of a ferromagnetic material having a Curie point Tc comprised between 20 and 800° C., each of said sub-areas being in contact with said material to be molded and/or with a possible coating consisting of a non-ferromagnetic material having heat conductivity of more than 30 W.m−1K−1, itself in contact with said molding material.

In an alternative of this preferred embodiment, the transfer sub-areas have identical Curie points but consist of different proportions of magnetic compounds.

In another alternative of this preferred embodiment of the mold according to the second object of the invention, the heat transfer sub-areas have different Curie points, which may consist of two iron-nickel alloys of different composition or else further of an iron-nickel alloy of identical composition but of different crystallographic structure.

The molds according to the invention may further incorporate the following features, taken individually or as a combination:

the cavity has at least one angle area, at least one heat transfer sub-area surrounding this area, the coating in non-ferromagnetic material consists of aluminium, copper, tin or alloys thereof, the Curie point is comprised between 60 and 350° C., the ferromagnetic material consists of an iron-nickel alloy, preferably comprising at least 25% by weight of nickel, from 0.001 to 10% of manganese as well as inevitable impurities resulting from the elaboration and which may contain up to 15% by weight of chromium, up to 15% by weight of cobalt, up to 15% by weight of copper, up to 10% by weight of at least one element selected from silicon, aluminium, vanadium, molybdenum, tungsten or niobium, and may further comprise at least one element selected from sulfur, boron, magnesium or calcium.

A second object of the invention is formed by a method for manufacturing a mold according to the first object of the invention, wherein an upper portion and a lower portion of a mold are fed, delimiting a cavity and at least one of said lower and upper portions of which have a heat transfer area comprising a ferromagnetic metal alloy, and then a layer of a non-ferromagnetic material is deposited having a heat conductivity of more than 30 W.m−1K−1 over all or part of the portion of said heat transfer area consisting of said ferromagnetic alloy. Preferably, the metal or metal alloy layer having a heat conductivity of more than 30 W.m−1K−1 consists of aluminium, copper, tin or alloys thereof, in particular alloys of copper and of nickel.

A third object of the invention is formed by a method for manufacturing a mold according to the second object of the invention, wherein an upper portion and a lower mold portion are fed, delimiting a cavity and at least one of said lower and upper portions of which has a heat transfer area comprising a ferromagnetic alloy, and a non-ferromagnetic metal or alloy layer is deposited on all or part of the portion of said heat transfer area consisting of said ferromagnetic alloy and said metal or alloy layer is diffused by localized heat treatment, said metal or alloy being selected so as to cause precipitation of a magnetic phases by its diffusion, thereby forming a heat transfer sub-area, the proportion of magnetic compounds of which is different from all or part of the remainder of the heat transfer area. Preferably, the heat transfer area initially comprises an austenitic or austeno-ferritic or austeno-martensitic iron-nickel alloy comprising at least 25% by weight of nickel, from 0.001 to 10% of manganese as well as inevitable impurities resulting from the elaboration and which may contain up to 15% by weight of chromium, up to 15% by weight of cobalt, up to 15% by weight of copper, up to 10% by weight of at least one element selected from silicon, aluminium, vanadium, molybdenum, tungsten or niobium and which may further contain at least one element selected from sulfur, boron, magnesium or calcium, and the non-ferromagnetic metal consists of aluminium.

A fourth object of the invention is formed by a method for manufacturing a mold according to the second object of the invention, wherein an upper portion and a lower portion of a mold are fed, delimiting a cavity and at least one of said lower and upper portions of which has a heat transfer area comprising a ferromagnetic alloy, and then it is preceded with localized heat treatment on at least one portion of said heat transfer area consisting of said alloy, so as to form a heat transfer sub-area, whereof the crystallographic structure and therefore the Curie point are different from all or part of the remainder of the heat transfer area. Preferably the heat transfer area initially comprises an austenitic or austeno-ferritic or austeno-martensitic iron-nickel alloy comprising at least 25% by weight of nickel, from 0.001 to 10% of manganese as well as inevitable impurities resulting from the elaboration and which may contain up to 15% by weight of chromium, up to 15% by weight of cobalt, up to 15% by weight of copper, up to 10% by weight of at least one element selected from silicon, aluminium, vanadium, molybdenum, tungsten or niobium, and which may further contain at least one element selected from sulfur, boron, magnesium or calcium, and said localized heat treatment consists in rapidly cooling said heat transfer area portion, thereby causing transformation of all or part of the austenite into martensite.

A fifth object of the invention is formed by a method for manufacturing a mold according to the second object of the invention, wherein an upper portion and a lower portion of a mold are fed, delimiting a cavity and at least one of said lower and upper portions of which has a heat transfer area comprising a ferromagnetic metal alloy, and a layer of a non-ferromagnetic alloy or metal is deposited on all or part of the portion of said heat transfer area consisting of said alloy and said non-ferromagnetic metal or alloy layer is diffused by localized heat treatment, said metal or alloy being selected so as to locally modify the Curie point by its diffusion thereby forming a heat transfer sub-area, the Curie point of which is different from that of all or part of the remainder of the heat transfer area. Preferably, the heat transfer area initially comprises an iron-nickel alloy comprising at least 25% by weight of nickel as well as inevitable impurities resulting from the elaboration and which may contain up to 10% by weight of chromium, up to 10% by weight of cobalt and up to 10% by weight of copper, and said metal deposited on at least one portion of the heat transfer area is copper.

A sixth object of the invention is formed by a device for induction-molding comprising a mold according to the invention and at least one electromagnetic inductor.

A seventh object of the invention is formed by a method for manufacturing a product in plastic or composite material by means of a mold according to the invention, wherein said plastic material or said composite materials, are introduced inside the cavity of said mold and then shaped by contact with said lower and upper portions of the mold, at least one of which is brought to a homogeneous temperature within plus or minus 8° C., and preferably within plus or minus 5° C., and comprised between 60° C. and 350° C. by the action of an induced current generated by said electromagnetic inductor.

Within the scope of the present invention, by the term of plastic are notably designated thermoplastic compounds, thermosetting compounds, elastomers, vulcanizable compounds.

Moreover, by the term of composite, is meant any combination of the plastic materials cited above with an element such as glass, carbon, an oxide, a metal or a metal alloy. This additional element may be incorporated in the form of dispersed fibers, or in the form of a woven or non-woven network, or else further in the form of one or several facings adhering to the plastic material so as to form a sandwich or bilayer structure, or else further a cell structure such as a honeycomb structure for example.

As this will have been understood, the definition of the mold according to the invention is based on the modulation of the characteristics of use of the heat transfer area, thereby giving the possibility of attenuating the heterogeneities of surface temperature of this mold. Indeed, it was seen in a new and surprising way that obtaining a homogeneous temperature at the functional surface of the mold required heterogeneity of the characteristics of use of the heat transfer area.

In particular, it was seen that overheatings had notably occurred in concentration areas of induced currents and subheatings in areas where the induced currents do not flow. These phenomena notably depend on the geometry of the parts to be manufactured, the angular areas with an acute angle ranging up to a right angle being the center of current concentrations by a spiking effect, while the obtuse angle angular areas are short-circuited and do not see the induced current.

DETAILED DESCRIPTION

Within the scope of the present invention, by angular area or angle area is meant an area at which the general direction of the surface of the molding cavity changes substantially.

Figure 1:
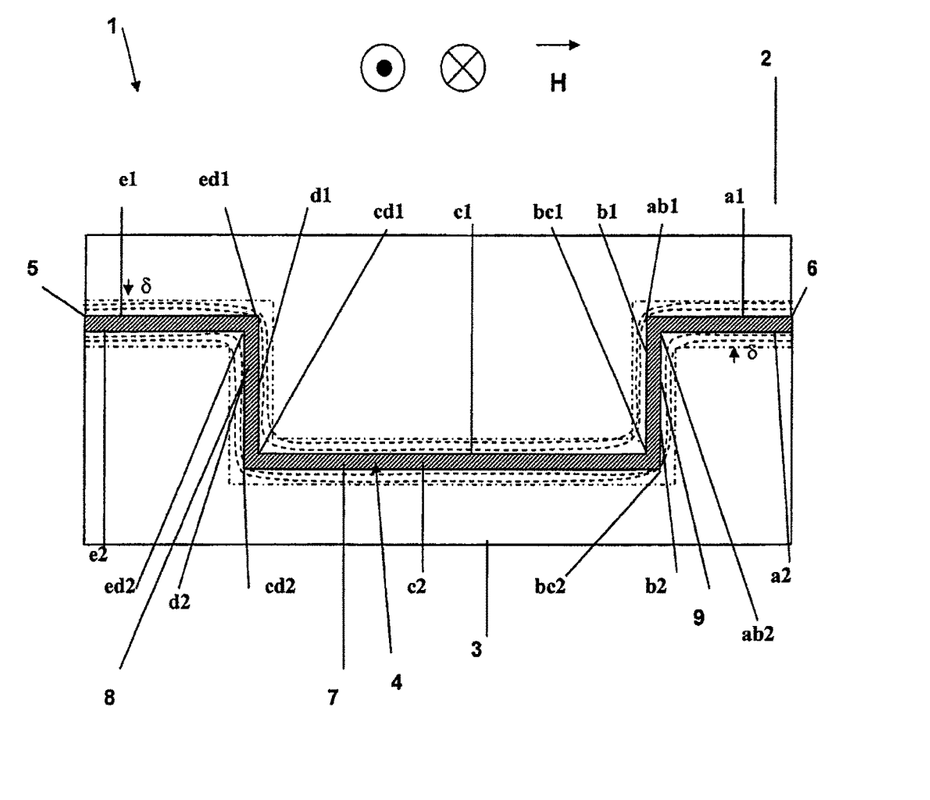
FIG. 1 is a sectional view of an exemplary mold.

Thus, if reference is made to FIG. 1, a sectional view of an exemplary mold 1 according to the prior art may be seen therein, in two upper 2 and lower 3 portions defining in their air gap, a cavity entirely filled with plastic material 4 during molding. The mold 1 is entirely made in a magnetic material having a Curie point Tc close to the transformation temperature Ttr of the molding material. The manufactured object, here a basin, includes two horizontal side edges 5 and 6 connected to a bottom 7 through two vertical side walls 8 and 9.

The FIGURE also includes the indication of the orientation of the magnetic field H to which the mold is subject under the effect of one or several electromagnetic inductors (not shown) through which flows an electric current of frequency f. The electromagnetic inductors are preferably integrated into the lower portion and into the upper portion of the body of the mold, as this may be seen in FIG. 1 of FR 2 867 939. The FIGURE also includes circulation lines of induced currents generated by the action of the magnetic field H and illustrated by two dotted lines in each of the portions 2 and 3 of the mold. Finally it includes an illustration of the skin areas of the portions 2 and 3 delimited by a dotted line with an alternation of dashes and dots.

In the case of this basin 1, the areas in which significant sub-heating was observed, are located in the vicinity of the areas ab2, bc1, cd1 and ed2 which are also areas where it is seen that the induced currents pass far away from the material during molding, these currents passing through the shortest way in order to cross the skin area. These areas may be defined as areas in which the angle extending from a first portion of the basin to a second portion is obtuse.

As regards now the overheating areas, they were observed in the vicinity of the areas ab1, bc2, cd2 and ed1 which are also areas where it is seen that the induced currents concentrate by a spiking effect. These areas may be defined as areas wherein the angle extending from a first portion of the basin to a second portion is acute.

Now, when the intention is to increase the power injected into a usually sub-heated area, it was established that the relevant local area should have greater magnetic permeability than the value of the surrounding areas, in the vicinity of the relevant operating temperature, i.e. in an interval of + or −10° C. around this operating temperature, which amounts to operating on inhomogeneous heat transfer permeability areas.

Conversely, when the intention is to reduce the power injected into a usually overheated area, the relevant local area must have a smaller magnetic permeability than the value of the surrounding areas, at the relevant operating temperature, i.e. in an interval of + or −10° C. around this operating temperature.

Of course, it is particularly advantageous to place the areas with modified permeabilities in the vicinity of the angular areas of the molding cavity, depending on the type of relevant angle. In particular stronger permeability areas may be positioned in sub-heated areas and reduced permeability areas in overheated areas, as they have been defined above.

One of the main alternatives of the invention consists of making available a mold having heat transfer sub-areas for which the magnetic permeabilities differ because they consist of magnetic materials for which the Curie points are different.

The adjustment of the Curie point may in particular be obtained by adjusting the composition of the relevant materials.

This may also be obtained by retaining a homogeneous chemical composition but by modifying the crystallographic structures of the materials depending on the relevant areas. Indeed, the Curie point of a material greatly depends on the crystallographic structure and may completely change when passing from an austenitic structure to a martensitic structure for example. Such a change in structure is itself easy to obtain since localized heat treatment may be sufficient for achieving it, whether this is a more or less rapid heating (such as an austenitization for example) and/or cooling step.

If a material area becomes a magnetic before another surface area of the mold because its temperature exceeds its Curie point, less than that of an adjacent area, the permeability of the area decreases from very high values to the value 1 and the injected power strongly decreases. Self-regulation of the temperature around the Curie point of the low Curie point area is then obtained, thus allowing fine adjustment of the temperature adjustments.

Another alternative of the invention consists of making available a mold having heat transfer sub-areas, the magnetic permeabilities of which differ although they consist of magnetic materials having identical Curie points. This local decrease in the permeability may in particular be obtained by depositing and then precipitating certain non-ferromagnetic elements, which do not have any influence on the Curie point, with magnetic elements of the initial magnetic alloy, so that the non-ferromagnetic phases are formed and therefore decrease the permeability of the relevant sub-area.

Nickel-iron alloys lend themselves well to these deposition and diffusion methods and in particular transformation temperatures comprised between 60 and 350° C. may be reached, fully compatible with the transformation temperatures of most plastics and composites, when they contain more than 25% by weight of nickel.

Additions of chromium, cobalt and copper may range up to 15% by weight notably allowing finer adjustment of the Curie points:

for example an austenitic alloy with 56% by weight of nickel (remainder=iron) by weight sees its Curie point pass from 530 to 300° C. when the molybdenum percentage passes from 0 to 11% by weight.

for example, an austenitic alloy with 40% by weight of nickel (remainder=iron) by weight sees its Curie point pass from 360 to 100° C. when the chromium percentage passes from 0 to 15% by weight.

for example an austenitic alloy containing 30 to 32% by weight of nickel and 2 to 8% by weight of chromium (remainder=iron) by weight has a continuous distribution of Curie points in the range from −20° C. to 170° C., and this for each of these compositions, the Curie point may be increased by 10 to 15° C. per percent by weight of addition element which are copper or cobalt.

Addition of 0.01 to 10% by manganese allows improvement in the hot shape ability of the alloy.

The preferred alloy according to the invention may further contain up to 10% by weight of at least one element selected from silicon, aluminium, vanadium, molybdenum, tungsten or niobium.

All these elements (Cr, Cu, Co, Mo, Si, Al, Nb, V, W), have the advantage of allowing adjustment of the Curie point to different values, while having different actions of these elements on important properties here such as electrical resistivity $\rho el$, or heat conductivity $\delta th$.

Thus, in austenitic alloys Fe—Ni—Mo, molybdenum significantly increases electrical resistivity: for example the alloy Fe-56% Ni sees its electric resistivity pass at room temperature from 30 $\mu\Omega.cm$ to 100 $\mu\Omega.cm$ when the molybdenum percentage passes from 0 to 9% by weight.

In austenitic alloys Fe—Ni—Cr, chromium significantly increases electrical resistivity: for example the alloy Fe-45% Ni sees its electric resistivity pass at room temperature from 45 $\mu\Omega.cm$ to 90 $\mu\Omega.cm$ when the chromium percentage passes from 0 to 6% by weight.

In austenitic alloys Fe—Ni—Cu, copper significantly decreases electrical resistivity: for example the alloy Fe-30% Ni sees its electrical resistivity pass at room temperature from 88 $\mu\Omega.cm$ to 78 $\mu\Omega.cm$ when the copper percentage passes from 4 to 10% by weight.

Also Si, Al, Nb, V and W more or less substantially low the Curie point Tc and increase the electrical resistivity.

Finally, this alloy may further comprise at least one element selected from sulfur, boron, magnesium or calcium. In particular it is preferred to limit the accumulated content of sulfur and boron to an interval from 2 to 60 ppm, while the accumulated content of magnesium and calcium will preferably be limited to an interval from 10 to 500 ppm. These elements notably allow improvement in the machine ability of the grade.

Moreover, regardless of the geometry of these parts, temperature undulations have further been observed at the heat transfer areas. Without intending to be bound by a theory, it is assumed that these undulations may come from the structure of the inductors which appear as turns and would be at the origin of induced "mirror" currents with respect to their location and to their shape.

It was seen that it was possible to considerably attenuate these undulations by covering all or part of the heat transfer area with a non-ferromagnetic material which conducts heat particularly well. Such a material apparently gives the possibility of playing the role of a heat wave diffuser, which attenuates the temperature differences in significant proportions. This type of regulation may in particular make sense on non-angular areas such as the areas c1 and c2 of the basin of FIG. 1.

Generally, the thickness of such coatings will be smaller than that of the heat transfer area and preferably less than one tenth of the skin thickness.

It is obvious that the different measures proposed within the scope of the invention for homogenizing the surface temperature of the mold may be combined insofar that they are compatible with each other.

The molds of the invention may be obtained by simply machining bulk blocks of magnetic materials or else by machining blocks of amagnetic materials, or even of non-metal materials, followed by deposition of a layer of magnetic materials by any suitable process, such as plating, deposition by plasma, by sputtering, or else further by projection. In all the cases, once a surface has been obtained with suitable geometrical dimensions and with suitable magnetic properties, it is possible to apply the method for manufacturing a mold according to the invention. This method in particular gives the possibility of simply obtaining a heat transfer area as one piece, without adding any insert.

For this purpose, all the alternatives described earlier may be used, which more particularly apply to the manufacturing of a mold, at least one portion of the heat transfer area of which comprises, or even consists of a iron-nickel matrix which will be modified at the locations identified as having to be adapted for ensuring good final temperature homogeneity.

The invention will now be described in more detail but in a non-limiting way and illustrated by examples.

EXAMPLES

A series of molds is made in different materials which will be described in each example. These molds all have a shape identical with the one of the mold of FIG. 1 for manufacturing a basin.

In a first series of examples, the plastic material to be molded making up the product is a thermoplastic composite with glass fiber and polypropylene matrix which has a transformation point at a temperature of 200° C.

In a second series of examples, the plastic material to be molded making up the product is a plastic which has a transformation point at a temperature of 125° C.

Unless indicated otherwise, the indicated percentages of the alloyed compositions are expressed by weight and all the compositions according to the invention contain 0.1% of manganese and of usual inevitable impurities resulting from the elaboration.

Counter-Example 1

In order to be able to compare the performances of the invention with those of the prior art, it was proceeded with a first molding test by means of a mold including added metal parts called inserts.

In the overheated areas identified earlier the material of the mold is locally replaced with these inserts consisting of non-magnetic materials such as austenitic stainless steel.

The inserts are placed in the concentration areas of the induced currents, which gives the possibility of locally reaching a highly increased penetration depth of the power. This means that the induced currents are no longer concentrated on the extreme surface of the bend but are spread out on the surrounding bend area thus dissipating less energy on the actual exchange surface of the bend.

In this case, one manages to limit the temperature difference between the mold and the product to an interval of the order of 20-30° C. which may be sufficient but requires a higher cost for building the molds, does not allow adjustment and perfect insert/mold heat transfer and does not allow the manufacturing of certain products with a complex geometry such as shapes with a funnel or a very deep bowl.

Counter-Example 2

It was then proceeded with a second test according to the prior art by making a mold for which the heat transfer area consists of a single ferromagnetic alloy.

The molds were machined in austenitic alloys FeNi or FeNiCr known for allowing easy adjustment of the Curie point by the composition. Indeed, it is well known that if a Curie point Tc is selected close to the desired plateau temperature (here for the shaping of plastics or composite), a temperature self-regulation phenomenon is obtained around Tc (the magnetic losses and currents disappear for a major part upon approaching the Curie point) and finally a rebalancing of the subheated and overheated areas.

With the solution using a FeNiCr alloy having Tc=210° C., one obtains:

thermal inhomogeneity around the marked angles of the product: ΔTangle=15° C.

thermal inhomogeneity at the bottom of the basin ΔTbasin=20° C.

thermal inhomogeneities reflecting the inductor turns ΔTinducturns=20° C.

Thus, therefore, the temperature self-regulation effect around the Curie point is mainly effective on the temperature homogeneity of the areas with an acute angle, reducing it to 15° C. instead of 20 to 30° C. with inserts and much more without any insert. The other types of thermal inhomogeneities are on the other hand little improved.

Example 1

An austenitic FeNiCr alloy is used, for which the Curie temperature Tc is in the vicinity of 210° C.—which may for example be Fe-35% Ni or Fe-37% Ni-6% Cr or Fe-50% Ni-11.5% Cr alloy—as a precursor to the homogeneous bulk condition under which the 3D shape of the plastic or composite product will be machined so as to be shaped by induction-heating.

In this example, after machining the heat transfer surfaces, an aluminium sheet of the order of 50 μm is flattened so that this sheet actually covers the functional machined surface of the mold, i.e. both surfaces facing the two parts of the mold.

Next, by laying both of these covered mold parts in an oven while keeping the aluminium sheet on the upper face of the mold, a heat treatment for melting/plating the aluminium on the surface is applied by bringing the mold part to a temperature above 600° C. for at least a few minutes but only allowing negligible diffusion of the aluminium into the FeNiCr alloy. The purpose of this heat treatment is actually only close adhesion of the aluminium onto the FeNiCr alloy (metal-metal bond).

It is then proceeded with a molding test by means of the obtained mold. One then obtains:

thermal inhomogeneity around the marked bends of the product ΔTangle=12° C.

ΔTbottom=20° C.

thermal inhomogeneities reflecting the inductor turns ΔTinducturns=8° C.

Thus, therefore, the temperature self-regulation effect around the Curie point is mainly effective on the temperature homogeneity of the areas with an acute angle and is reinforced by the thin aluminium conducting coating, reducing it to 12° C. instead of 15° C. without aluminium and from 20 to 30° C. with inserts and much more without any insert.

Further, the thin aluminium layer plays an interesting role as a heat diffuser even at these high frequencies and in relatively short heat transfer times (of the order of one minute) since the thermal heterogeneity resulting from the direct effect of localization of the turns of the inductor on the functional surface ΔTinducturns is brought back to 8° C. instead of 20° C. without the aluminium layer. The temperature of the bottom of the basin remains also far from the goal, which in certain cases of plastic or of product specifications may be accepted.

Example 2

Example no. 1 is reproduced but with another precursor alloy since the aim here is to obtain in a plastic material as shaped above, a temperature of 125° C. during heating by induction.

Different FeNiCrCu alloys having a Curie point very close to 125° C. were successfully tested here:

Fe-32% Ni
Fe-30.3% Ni-2%-Cr
Fe-36.5% Ni-9% Cr-0.2% Mn
Fe-29% Ni-2% Cr-3.5% Co
Fe-40% Ni-13% Cr-2% Co
Fe-30% Ni-2% Cr-3% Cu
Fe-28% Ni-2% Cr-5.5% Cu

Each alloy is supplied in the condition of a block in which the 3D shape of the plastic material to be shaped by induction-heating will be machined.

After machining the functional heat transfer surfaces, a 50 μm aluminium sheet is applied so that this sheet actually covers the functional machined surface of the mold, i.e. both surfaces facing both parts of the mold. Next, laying these two covered mold parts in an oven while keeping the aluminium sheet on the side of the upper face of the mold, a heat treatment for melting/plating aluminium is applied on the functional surface by bringing the mold parts to a temperature above 600° C. during at least a few minutes but only allowing negligible diffusion of the aluminium into the FeNiCr alloy. The purpose of this heat treatment is actually only close adhesion of the aluminium onto the FeNiCr alloy (metal-metal bond).

It is then proceeded with a molding test by means of the obtained mold.

One then obtains:

a thermal inhomogeneity around the marked bends of the product ΔTangle=10° C.

ΔTbottom=16° C.

thermal inhomogeneities reflecting the inductor turns ΔTinducturns=6° C.

The same advantages of performances (reduction of thermal heterogeneities) are thus verified as in Example 2 on the same complex product shape but with different heating temperatures and precursor alloy.

Example 3

An austenitic Fe-30% Ni-2% Cr-3% Cu alloy is used here, for which the Curie temperature Tc is in the vicinity of 125° C. for rapid shaping of a plastic material after induction heating.

This alloy is supplied in the condition of a block in which the 3D shape of the product to be shaped will be machined. After machining the functional heat transfer surfaces, a 50 μm aluminium sheet is applied so that this sheet actually covers the functional machined surface of the mold, i.e. both surfaces facing both parts of the mold.

Next, laying both covered mold parts in an oven while keeping the aluminium sheet on the upper side of the upper face of the mold, a heat treatment for melting/applying the aluminium is applied on the functional surface while bringing the mold parts to a temperature above 600° C. during at least a few minutes but only allowing negligible diffusion of the aluminium into the FeNiCrCu alloy. The purpose of this first heat treatment is only close adhesion of the aluminium onto the alloy (metal-metal bond). At this stage, the heat transfer surface is compliant and similar with those of the preceding Examples 1 and 2.

In a new heat treatment step, well differentiated from the preceding one, certain surfaces of the mold are heated with different known means (torch, localized inductor, pre-heated metal parts and contact, supply of energy by radiation . . . ) so as to cause diffusion under the surface of aluminium applied beforehand, then generating precipitation of a non-magnetic secondary phase and significant lowering of the permeability gr.

The faces subject to this intense supply of surface heat are necessarily the faces a1, a2, b1, b2, d1, d2, e1, e2, i.e. all the faces of the heat transfer surface except those of the bottom of the basin (c1 and c2). For the deposited aluminium, the heat supply should cause the surface temperature to be raised to at least 500° C., preferably at least 600° C. so as to cause diffusion of the aluminium into the sub-surface without too high overmelting of the aluminium degrading the homogeneity of the deposit.

It is then proceeded with a molding test by means of the obtained mold. One then obtains:

a thermal inhomogeneity around the marked bends of the product ΔTangle=12° C.

ΔTbottom=8° C.

thermal inhomogeneities reflecting the inductor turns ΔTinducturns=11° C.

Thus, therefore, the temperature self-regulation effect around the Curie point is mainly effective on the temperature inhomogeneity of the areas with an acute angle and is reinforced by the thin aluminium conducting coating, reducing it to 12° C. instead of 15° C. without aluminium and to 20-30° C. with insert and much more without any insert. Further, the thin aluminium layer plays a very interesting role of a heat diffuser even at these high frequencies and within also short heat transfer times (of the order of one minute) since the thermal heterogeneity resulting from the direct effect of localization of the turns of the inductor on the functional surface ΔTinducturns is brought back to 11° C. instead of 20° C. without the aluminium layer.

Further, in this case of forced diffusion of aluminium into a sub-surface of certain faces of the mold, the bottom bowl temperature is substantially raised to 8° C. from the goal, demonstrating the advantage of controlling the temperature heterogeneities with calibrated heterogeneities of properties in a heat transfer sub-area.

Example 4

An austenitic and ferromagnetic FeNiCrCu alloy is used here at room temperature after hot and then cold transformations followed by recrystallization and cooling annealing of 5° C./h to 5,000° C./h down to room temperature and with 25 to 36% Ni. Indeed, in this composition domain, having such an austenitic alloy (or possibly austeno-ferritic in certain composition cases) pass into liquid nitrogen, completely transforms it into martensite for which the Curie point is much higher at shaping operating temperatures aimed by the invention (<350° C.). By localizing this transformation effect to liquid nitrogen in sub-heated areas, the temperature of these areas is raised.

A transfer surface is used made from the alloy of Example 3 with a Curie point in the vicinity of 125° C. on the precursor alloy with one of the following alloys:

Fe-32% Ni

Fe-30.3% Ni-2% Cr

Fe-29% Ni-2% Cr-3.5% Co

Fe-30% Ni-2% Cr-3% Cu

Fe-28% Ni-2% Cr-5.5% Cu and then an aluminium sheet is applied by a first heat treatment on the surface, and then diffused into a sub-surface by a second heat treatment on the faces other than the bottom of the bowl. Finally, the protruding edges (ab2, bc1, cd1, ed2) of the transfer surface suffering from chronic sub-heating are locally treated with nitrogen in order to locally induce a martensitic structure and a strong local increase in Tc.

It is then proceeded with a molding test by means of the obtained mold. One then obtains:

a thermal inhomogeneity around the marked bends of the product ΔTangle=7° C.

ΔTbottom=9° C.

thermal inhomogeneities reflecting the inductor turns ΔTinducturns=10° C.

All the advantages already listed with Example 3 are thereby obtained with additionally a significant reduction in the temperature heterogeneity between bend areas which then drops to 7° C. instead of 10-12° C. without any martensitic transformation.

Example 5

An austenitic or austeno-ferritic alloy is used here with 25-34% Ni and <11% Cu, for which the Curie point is located in the vicinity of 125° C.—which may for example be a Fe-28% Ni-5% Cu alloy—as a precursor to the homogeneous bulk condition, in which the 3D shape of the product (plastic or composite) will be machined, to be shaped by induction heating.

After machining the heat transfer surfaces, a 50 μm aluminium sheet is applied so that this sheet actually covers the faces of the functional machine surface of the mold other than the faces of the bottom of the basin, therefore the faces of type a, b, d, e, f, g on both surfaces facing both mold parts. In a different way from the preceding examples, the faces of type c (bottom of the bowl) are covered with a thin 40 μm copper sheet.

And then the different heat treatments are subsequently successively carried out:

melting/application of the aluminium on the heat transfer surface by bringing the mold parts to a temperature above 600° C. for at least a few minutes but only allowing negligible diffusion of the aluminium into the FeNiCrCu alloy, melting/application of copper on the heat transfer surface by raising the mold parts to a temperature above 1,000° C. for at least a few minutes but allowing negligible diffusion of the copper into the FeNiCrCu alloy. This treatment will preferably be performed by putting the whole mold in an oven which will then allow diffusion of the aluminium into the sub-surface in order to precipitate secondary and magnetic phases and adjust the permeability in the relevant sub-surface.

surface heating of the copper localized at the faces of type c for a sufficiently long time and at a high temperature so that the copper is mixed with the matrix of the precursor alloy FeNiCrCu. Thus the Curie point at the surface of type c is increased.

Finally, a localized quench is carried out in liquid nitrogen of the protruding edges of the molding cavity, as described in Example 4, in order to modify the microstructure of the magnetic alloy.

It is then proceeded with a molding test by means of the obtained mold.

One then obtains:

a thermal inhomogeneity around the marked bends of the product ΔTangle=6° C.

ΔTbottom=8° C.

thermal inhomogeneities reflecting the inductor turns ΔTinducturns=8° C.

With this method, one therefore also manages to reduce the different thermal heterogeneities very satisfactorily.

As this will have been understood, the present invention proposes several solutions with which the surface temperature heterogeneities of the heat transfer area of a mold may be attenuated at most, it being understood that these different solutions may be combined at will depending on the particular geometry of the product to be obtained and therefore on the corresponding molding cavity.

The description which has just been made more particularly relates to the molding of plastic material and of composite but is not limited thereto, such a mold may find uses for shaping other types of products such as glasses, metals or metal alloys for example. In the case of metal products, the shaping of the materials may in particular be carried out by hot die stamping.

What is claimed is:

1. A mold comprising:
    at least one lower portion and one upper portion delimiting a cavity, the upper and lower portions being heated by the action of an induced current generated by at least one electromagnetic inductor,
    wherein the mold is configured to allow a molding material to be brought to a temperature Ttr of more than 20° C. to be introduced into the cavity and to shape the molding material by contact with the lower and upper portions of the mold
    at least one of the lower and upper portions having a heat transfer area configured to be in contact with the molding material during shaping, the heat transfer area comprising at least one ferromagnetic material having a Curie point Tc between 20 and 800'C,
    at least one sub-area of the heat transfer area is coated with a non-ferromagnetic material with a heat conductivity of more than 30 $W.m^{-1}K^{-1}$, the coating being configured to be in contact with the molding material during shaping, and
    configured such that in the rest of the heat transfer area the at least one ferromagnetic material is in contact with the molding material during shaping.

2. The mold as recited in claim 1 wherein the cavity has at least one angle area, and at least one heat transfer sub-area surrounding the angle area.

3. The mold as recited in claim 1 wherein the coating includes aluminium, copper, tin or alloys thereof.

4. The mold as recited in claim 1 wherein the Curie point is between 60 and 350° C.

5. The mold as recited in claim 1 wherein the ferromagnetic material includes an iron-nickel alloy.

6. The mold as recited in claim 5, wherein the ferromagnetic material comprises iron, at least 25% by weight of nickel, from 0.001 to 10% of manganese as well as inevitable resulting impurities resulting from the melting and possibly containing up to 15% by weight of chromium, up to 15% by weight of cobalt, up to 15% by weight of copper, and up to 10% by weight of at least one element selected from the group consisting of silicon, aluminium, vanadium, molybdenum, tungsten and niobium.

7. The mold as recited in claim 6 wherein the ferromagnetic material further comprises at least one element selected from the group comprising sulfur, boron, magnesium and calcium.

8. The mold as recited in claim 1 wherein the heat transfer area is a one-piece area.

9. A method for manufacturing the mold as recited in claim 1 comprising,
    providing the at least one upper portion and lower portion of the mold to delimit the cavity wherein at least one of said lower and upper portions has the at least one heat transfer area comprising the ferromagnetic metal alloy having a Curie point Tc comprised between 20 and 800° C., and
    depositing a partial layer of the non-ferromagnetic material having a heat conductivity of more than 30 $W.m^{-1}K^{-1}$ to form the at the least one sub-area of said heat transfer area, leaving the ferromagnetic material in the rest of the heat transfer area free from the layer of the non-ferromagnetic material.

10. The method as recited in clam 9 wherein the non ferromagnetic material layer having a heat conductivity of more that 30 W.m-1K-1 includes aluminium, copper, tin or alloys thereof.

11. The method as recited in claim 10 wherein the non-ferromagnetic material layer having a heat conductivity of more that 30 $W.m^{-1}K^{-1}$ includes alloys of copper and nickel.

12. An induction molding device comprising: the mold as recited in claim 1 and at least one electromagnetic inductor.

13. A method for manufacturing a plastic or composite material using the induction molding device recited in claim 12, comprising,
    selecting a plastic material or a composite material as the molding material
    introducing the molding material into the cavity of the mold,
    shaping the molding material by contact with the lower and upper portions of the mold, and
    heating at least one of the lower and upper portions of the mold to a homogeneous temperature between 60° C. and 350° C. by an induced current generated by the electromagnetic inductor, wherein the temperature is homogeneous to within plus or minus 8° C.

14. The method as recited in claim 13 wherein the temperature is homogeneous to within plus or minus 5° C.

15. The mold as recited in claim 1, wherein the at least one sub-area comprises at least two heat transfer sub-areas having magnetic permeability different from each other in the vicinity of the temperature Ttr, at least one of the sub-areas having the ferromagnetic material having a Curie point Tc comprised between 20 and 800° C., each of the sub-areas being in contact with the coating.

16. The mold as recited in claim 15 wherein the heat transfer sub-areas have identical Curie points but different proportions of magnetic compounds.

17. The mold as recited in claim 15, wherein the heat transfer sub-areas have different Curie points.

18. The mold as recited in claim 17 wherein the heat transfer sub-areas include two iron-nickel alloys of different composition.

19. The mold as recited in claim 17 wherein the heat transfer sub-areas include an iron-nickel alloy of identical composition but of different crystallographic structure.

20. A method for manufacturing the mold as recited in claim 15 comprising,
providing, the at least one upper portion and lower portion of the mold to delimit the cavity and wherein at least one of the lower and upper portions has the at least one heat transfer area comprising the ferromagnetic material comprising a ferromagnetic metal alloy,
depositing the non-ferromagnetic material comprising a non-ferromagnetic alloy or metal to form the at least one sub-area of the heat transfer area, leaving the ferromagnetic material in rest of the heat transfer area free from the non-ferromagnetic material, and
diffusing the layer of the non-ferromagnetic material by localized heat treatment,
wherein the metal or alloy of the non-ferromagnetic material is selected so as to cause precipitation of amagnetic phases by diffusion, thereby forming the heat transfer sub-area with a proportion of magnetic compounds is different from a proportion of magnetic compounds in the rest of the heat transfer area.

21. The method as recited in claim 20, wherein the heat transfer area initially comprises an austenitic or austeno-ferritic or austeno-martensitic iron-nickel alloy comprising at least 25% by weight of nickel, from 0.001 to 10% of manganese as well as inevitable resulting impurities and possibly containing up to 15% by weight of chromium, up to 15% by weight of cobalt, up to 15% by weight of copper, and up to 10% by weight of at least one element selected from the group consisting of silicon, aluminium, vanadium, molybdenum, tungsten and niobium.

22. The method are recited in claim 21 wherein the ferromagnetic material further comprises at least on element selected from the group comprising sulfur, boron, magnesium and calcium.

23. The method for manufacturing the mold as recited in claim 15 comprising,
providing the at least one upper portion and lower portion of the mold to delimit the cavity wherein at least one of the upper and lower portions has a heat transfer area comprising the ferromagnetic material comprising a ferromagnetic metal alloy, and
forming the at least one heat transfer sub-area by performing a localized heat treatment on at least one portion of the heat transfer area comprising the ferromagnetic alloy, so as to form a heat transfer sub-area with a crystallographic structure and Curie point different from that of all or part of the rest of the heat transfer area.

24. The method as recited in claim 23, wherein said heat transfer area initially comprises an austenitic or austeno-ferritic or austeno-martensitic iron-nickel alloy comprising at least 25% by weight of nickel, from 0.001 to 10% of manganese as well as inevitable impurities resulting from the elaboration and possibly containing up to 15% by weight of chromium; up to 15% by weight of cobalt, up to 15% by weight of copper, and up to 10% by weight of at least one element selected from the group consisting of silicon, aluminium, vanadium, molybdenum, tungsten and niobium, and said localized heat treatment includes cooling the heat transfer area portion to cause transformation of all or part of the austenite into martensite.

25. The method as recited in claim 24 wherein the ferromagnetic material further comprises at least on element selected from the group comprising sulfur, boron, magnesium and calcium.

26. A method for manufacturing a mold as recited in claim 15 comprising,
providing the at least one upper portion and lower portion of the mold to delimit the cavity and for which at least one of the lower and upper portions has the at least one sub-area of the heat transfer area comprising the ferromagnetic material comprising a ferromagnetic metal alloy, and
depositing a layer of the non-ferromagnetic material comprising a non-ferromagnetic metal or alloy on at least one sub-area of the heat transfer area, leaving the ferromagnetic material in the rest of the heat transfer area free from the layer of the non ferromagnetic material, and
diffusing the non-ferromagnetic metal or alloy layer by localized heat treatment, the non-ferromagnetic metal or alloy being selected so as to locally modify the Curie point by its diffusion thereby forming a heat transfer sub-area for which the Curie point is different from that of the rest of the heat transfer area.

27. The method as recited in claim 26, wherein the heat transfer area initially comprises an iron-nickel alloy comprising at least 25% by weight of nickel as well as inevitable resulting impurities and possibly containing up to 10% by weight of chromium, up to 10% by weight of cobalt and up to 10% by weight of copper, and the metal deposited on at least one portion of said heat transfer area is copper.

* * * * *